United States Patent [19]

Carpenter et al.

[11] Patent Number: 5,156,677

[45] Date of Patent: Oct. 20, 1992

[54] TREATMENT OF ALUMINUM FLAKE PIGMENT FOR USE IN ORGANIC COATING COMPOSITIONS

[75] Inventors: Clint W. Carpenter, Royal Oak; Lynne G. Bemer, Northville; Glenn E. Martin, Farmington Hills, all of Mich.

[73] Assignee: BASF Corporation, Southfield, Mich.

[21] Appl. No.: 883,086

[22] Filed: May 15, 1992

[51] Int. Cl.$^5$ ............................................. C09C 1/62
[52] U.S. Cl. ................................. 106/404; 106/14.12; 106/14.15; 106/287.17; 106/287.23; 106/287.24; 106/287.25; 106/287.29; 106/401; 106/403; 106/499
[58] Field of Search .................. 106/403, 404, 14.12, 106/14.15, 287.17, 287.23, 287.24, 287.25, 287.29, 401, 499

[56] References Cited

U.S. PATENT DOCUMENTS

| | | | |
|---|---|---|---|
| 4,213,886 | 7/1980 | Turner | 260/29.6 |
| 4,350,535 | 9/1982 | Ishijima et al. | 106/308 |
| 4,565,716 | 1/1986 | Williams, Jr. et al. | 427/216 |
| 4,675,358 | 6/1987 | Frangou | 524/439 |
| 4,750,940 | 6/1988 | Higashi et al. | 106/290 |
| 5,039,343 | 8/1991 | Umeda et al. | 106/404 |
| 5,057,156 | 10/1991 | Kuwajima et al. | 106/403 |

*Primary Examiner*—Mark L. Bell
*Assistant Examiner*—Scott L. Hertzog
*Attorney, Agent, or Firm*—Paul L. Marshall

[57] ABSTRACT

A compound is described that is useful for metal surface modification, particularly aluminum flake pigment surface modification, having the formula:

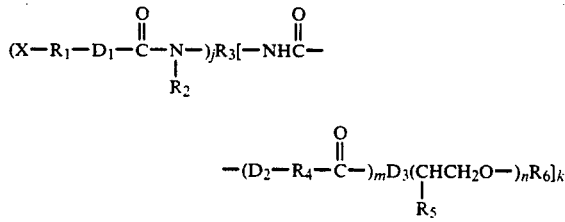

where $X$, $R_1$, $R_2$, $R_3$, $R_4$, $R_5$, $R_6$, $D_1$, $D_2$, $D_3$, $j$, $k$, $m$, and $n$ are as defined herein.

A method for surface modification of a metallic flake pigment with the compound and compositions containing the surface modified metallic flake pigment is also described.

25 Claims, No Drawings

TREATMENT OF ALUMINUM FLAKE PIGMENT FOR USE IN ORGANIC COATING COMPOSITIONS

BACKGROUND OF THE INVENTION

The present invention relates to compounds that are useful for surface modification of metallic particles, such as metallic flake pigments. In particular, the invention concerns decorative coatings formed from aqueous compositions containing metallic flake pigments that are surface modified with such compounds.

The use of metallic flake pigments, such as aluminum flake pigments, in decorative coatings to give the coating a metallic effect is widespread. The metallic effect is particularly popular with customers in the automotive market, and metallic colors form a large share of automotive paints.

Automotive coatings may utilize a single, uniformly pigmented layer. Alternatively, they may have two distinct layers—a lower, highly pigmented layer and an upper layer with little or no pigmentation. The two-layer coating is known in the industry as basecoat/clearcoat or color plus clear coat. Basecoat/clearcoat coatings impart a high level of gloss and depth of color that result in a particularly appealing look. Metallic flake pigments may be incorporated to give the coating a metallic effect.

Concerns over organic solvent emissions during application of paints have resulted in the introduction of waterborne automotive paints, especially waterborne basecoat paints. The new waterborne technology has the disadvantage of using a medium corrosive to the popular metallic flake pigments. When a paint with oxidized metallic flake pigments is coated onto a substrate, the coating shows discoloration and diminished metallic effect. Furthermore, oxidation of the metallic surfaces by the water results in the evolution of hydrogen gas, which may accumulate in storage of the paint.

Considerable work has been done in the industry to try to protect the metal surfaces from the water. The metallic flake may be treated with inorganic reagents, such as chromates, according to the process of Kondis (U.S. Pat. No. 4,693,754); or the flake may be first encapsulated with a silica coating and then treated with a carboxylic chromic chloride as disclosed by Batzar (U.S. Pat. No. 3,954,496). However, these treatments are known to be detrimental to the appearance of the flake in a coating, either from discoloration or decreased luster. The toxicity of the inorganic reagents used in such treatments is also a concern.

Organic phosphate or phosphite treatments have been used, including the simple phosphate esters of Williams, Jr. et al. (U.S. Pat. No. 4,565,716), such as mixtures of mono- and di-phosphates of monoalcohols like octylphenol, ethylene glycol monobutyl ether, or octanol; and polymeric esters like those disclosed by Frangou (U.S. Pat. No. 4,675,358). However, at the levels required to give protection comparable to the inorganic treatments, the coating may exhibit loss of adhesion to other layers or a cohesive failure within the coating layer.

A method of coating an aluminum flake with a monoethylenically unsaturated silane, said silane then being reacted with acrylic monomers, is disclosed by Turner (U.S. Pat. No. 4,213,886). However, this method does not provide for a well-dispersed flake pigment in the aqueous paint composition. The poor dispersion of the flake pigment diminishes the metallic effect in the coating prepared therefrom.

It has been discovered that metallic flake pigments that are surface modified with the compounds of the present invention are particularly resistant to oxidation in waterborne paints with minimal discoloration or diminution of the metallic effect in the coating. It has also been discovered metallic flake pigments surface modified according to the present invention form superior dispersions in water in comparison to metallic flake pigments using previously known surface treatments. This superior dispersion in the waterborne paint composition results in a coating with an enhanced metallic effect. Moreover, when the compounds of the present invention are used at levels necessary to prevent oxidation of the metallic pigment, the coating does not exhibit any loss of adhesion to other layers or any cohesive failure within the coating layer.

SUMMARY OF THE INVENTION

The present invention provides, in one aspect, a compound useful for metal surface modification having the formula:

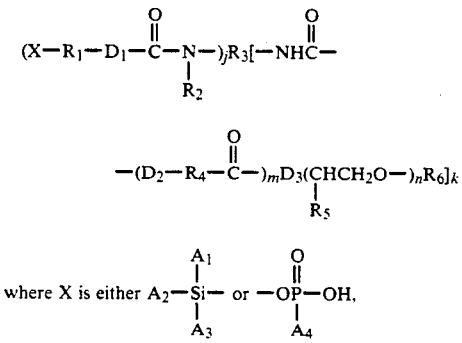

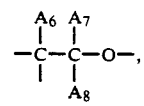

and $A_1$, $A_2$, $A_3$, and $A_4$ are each independently hydroxy, alkyl of one to ten carbon atoms, alkoxy of one to ten carbon atoms, alkoxyalkoxy of two to ten carbon atoms, alkanoyloxy of two to ten carbon atoms, or halogen, with the proviso that $A_1$, $A_2$, and $A_3$ may not all be alkyl. $R_1$ is a divalent radical selected from straight or branched alkylenes of one to twelve carbon atoms. $D_1$ is either a divalent radical selected from the group consisting of —O—, —NA$_5$—, and —S—, or a trivalent radical of the formula $$\begin{array}{c} A_6 \ A_7 \\ | \ \ | \\ -C-C-O-, \\ | \ \ | \\ \ \ \ \ A_8 \end{array}$$

wherein $A_5$, $A_6$, $A_7$ and $A_8$ are each independently hydrogen or alkyl of one to twelve carbon atoms. $R_2$ is hydrogen or a covalent bond with $D_1$, with the proviso that $R_2$ is only a covalent bond with $D_1$ when $D_1$ is a trivalent radical. $R_3$ is a polymeric backbone. The term "polymeric" is meant to include oligomeric groups also. $D_2$ and $D_3$ are divalent radicals, each independently —O— or —NA$_9$—, where $A_9$ is hydrogen or alkyl of one to twelve carbon atoms. $R_4$ is a divalent radical selected from straight or branched alkylenes of three to thirty carbon atoms. The segment represented by $(D_2R_4C(=O)-)$ is therefore either polyester or polyamide and has a degree of polymerization of m, m being an integer from one to one thousand. $R_5$ is hydrogen or a mixture of hydrogen and alkyl of one to eight carbon atoms. That part of the molecule represented by $(CH(R_5)CH_2O-)_n$ is therefore either polyethylene oxide or a polyethylene oxide/polyalkylene oxide copolymer, having a degree of polymerization of n, n being an integer from one to one thousand. $R_6$ is alkyl of one to thirty carbon atoms. The numbers of substitutions of each kind on the polymeric backbone are represented by j and k, where j and k are integers, each independently being one to fifty.

Another aspect of the present invention provides for a metallic flake pigment surface modified with at least one compound as described above. The metal may be aluminum, gold bronze (copper-zinc alloys), copper, nickel, magnesium, zinc, and alloys of these. The metallic flake pigment surface modified with the compound of the invention experiences improved stability in aqueous environments and a retarded rate of oxidation compared to metallic flake pigment without surface modification. The compound of the invention also improves dispersion of metallic flake pigments in aqueous compositions. The terms "surface modification" and "surface modified" encompass any and all associations, interactions, or reactions between the metallic surface and the compound in accordance with the disclosed invention.

Another aspect of the present invention provides for a composition having a polymeric network containing a residue of the compound described hereinabove. Such a polymeric network is formed through the reactions of species having more than one reactive group, such as polymers and crosslinkers well-known to the art, and the compound, when the compound contains a group reactive with at least one of the species, said group forming a covalent bond to become a part of the polymeric network. That part of the polymeric network originally contained in the compound is termed a residue of the compound. Preferably, the composition also contains a metallic flake pigment surface modified with the compound as described hereinabove.

Yet another aspect of the present invention provides for a coated article. The coated article is a substrate with a coating thereon. The coating on the substrate may contain the metallic flake pigment surface modified with any one or more of the compounds described above, or a composition containing a metallic flake pigment that has been surface modified with the compound and a polymeric network containing a residue of the compound.

In a further aspect of the invention, a method of surface modification of a metallic flake pigment is provided, comprising mixing the metallic flake pigment with the compound.

In yet a further aspect of the invention, a method of making an aqueous composition is provided, comprising the steps of mixing a metallic flake pigment with the compound to produce a surface-modified metallic flake pigment, and then combining the surface-modified metallic flake pigment, water, and at least one water-compatible polymer. By "water-compatible" it is meant that the polymer is either dispersible or soluble in water.

The compounds of the present invention are particularly effective for modification of metal surfaces. Metallic flake pigment surface modified with at least one compound according to the invention is resistant to oxidation by water. Furthermore, metallic flake pigment surface modified with at least one compound according to the invention has improved dispersibility in aqueous compositions.

The present invention provides an effective method for surface modification of a metallic flake pigment with a compound according to the invention, and for making an aqueous composition containing the metallic flake pigment surface modified with the compound and a water-compatible polymer.

The present invention also provides a coated article that is a coating on a substrate, wherein the coating contains a metallic flake pigment surface modified with at least one compound according to the invention, or a polymeric network containing a residue of at least one compound according to the invention. The coating has excellent appearance and adhesion properties.

DETAILED DESCRIPTION OF THE INVENTION

The compounds that have been found to be useful for metal surface modification are of the formula:

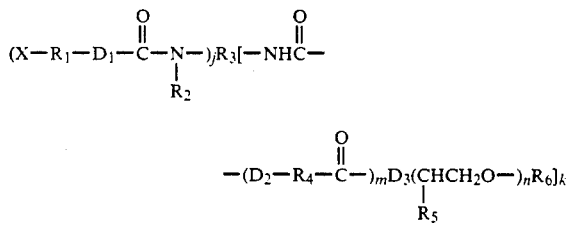

The compounds have a polymeric backbone, $R_3$, having at least two different substituents. The first substituent, $XR_1D_1$, has a terminal functionality, X, that is either silyl or phosphate. The second substituent has a hydrophobic portion, represented by $(D_2R_4C(=O)-)_m$, and a terminal hydrophilic portion, represented by $(CH(R_5)CH_2O-)_nR_6$. The first substituent is linked to the polymeric backbone via the linking group $-C(=O)-NR_2-$. The second substituent is linked to the polymeric backbone via the linking group $-C(=O)-NH-$.

The polymeric backbone, $R_3$, may be, for example, an acrylic, urethane, polyester, alkyd or epoxy polymer or oligomer. Acrylic and urethane backbones are preferred. The polymeric backbone when synthesized includes thereon at least two isocyanate groups or latent isocyanate groups. This may be accomplished by either copolymerizing into the polymeric backbone a monomer with isocyanate or latent isocyanate functionality, or by reacting a group with isocyanate or latent isocyanate functionality onto the polymer. The reaction of the isocyanate or latent isocyanate functionality with an isocyanate-reactive functionality of the first substituent or the second substituent forms the appropriate linking group.

Illustrative examples of isocyanate or latent isocyanate functional urethane backbones are urethane polymers with terminal isocyanate or latent isocyanate functionality. The urethane polymers may be synthesized by known techniques, such as bulk polymerization or, preferably, solution polymerization, from polyisocyanates and polyfunctional compounds reactive with polyisocyanates, including, for example, polyols, polyamines, and aminoalcohols; with the proviso that the sum of equivalents of isocyanate and latent isocyanate groups used exceeds the equivalents used of polyfunctional compounds reactive with polyisocyanates. The polyisocyanate may be, for example, isophorone diisocyanate, p-phenylene diisocyanate, biphenyl 4, 4' diisocyanate, meta-xylylene diisocyanate, toluene diisocyanate, 3,3'-dimethyl-4,4'-biphenylene diisocyanate, 1,4-tetramethylene diisocyanate, 1,6-hexamethylene diisocyanate, 2,2,4-trimethylhexane-1,6-diisocyanate, 1,3-bis-[2-(-(isocyanato)propyl]benzene (also known as tetramethylxylyldiisocyanate, TMXDI) methylene bis-(phenyl isocyanate), 1,5-naphthalene diisocyanate, bis-(isocyanatoethyl fumarate), methylene bis-(4-cyclohexyl isocyanate), and biurets or isocyanurates of any of these.

The polyfunctional compounds reactive with polyisocyanates may include any of diols, triols, or alcohols of higher functionality, such as ethylene glycol, propylene glycol, 1,4-butanediol, 1,6-hexanediol, neopentyl glycol, trimethylolethane, trimethylolpropane, pentaerythritol, polyester polyols, polyether polyols, and the like; polyamines, such as ethylene diamine and diethylene triamine; or aminoalcohols, such as diethanolamine and ethanolamine.

Preferably, one of either the polyisocyanate or the polyfunctional compound reactive with polyisocyanate has functionality (including latent functionality) greater than two. The reactants are apportioned so that the polyurethane copolymer has terminal isocyanate functionality and a weight average molecular weight preferably of at least 1000, and more preferably from 1000 to 20,000. The weight average molecular weight is determined by gel permeation chromatography using polystyrene standards.

Illustrative examples of isocyanate or latent isocyanate functional acrylics are copolymers of an ethylenically unsaturated monomer containing an isocyanate or latent isocyanate group. The copolymers may be prepared by using conventional techniques, such as free radical polymerization cationic polymerization, or anionic polymerization, in, for example, a batch or semi-batch process. For instance, the polymerization may be carried out by heating the ethylenically unsaturated monomers in bulk or in organic solution in the presence of a free radical source, such as an organic peroxide or azo compound and, optionally, a chain transfer agent for a batch process; or, alternatively, the monomers and initiator(s) may be fed into the heated reactor at a controlled rate in a semi-batch process.

In a particularly preferred embodiment, the ethylenically unsaturated monomer containing an isocyanate group is meta-isopropenyl-$\alpha,\alpha$-dimethylbenzyl isocyanate. Meta-isopropenyl-$\alpha,\alpha$-dimethylbenzyl isocyanate is available from American Cyanamid Company, Wayne, New Jersey under the trade name "TMI ® (Meta) unsaturated aliphatic isocyanate," and is described in American Cyanamid Company's publication "TMI ® (Meta) unsaturated aliphatic isocyanate", publication number 2-849 1/88. Other copolymerizable monomers can be acrylonitrile, acrylic or methacrylic acid, alkyl esters of acrylic or methacrylic acid, e.g., ethyl acrylate, butyl acrylate, 2-ethylhexyl acrylate, methyl methacrylate, butyl methacrylate, propyl methacrylate, lauryl methacrylate, 2-ethylhexyl methacrylate, and the like; and vinyl monomers, such as styrene, vinyl toluene, maleic anhydride, vinyl propionate, and the like. The choice of monomers is not critical, so long as no monomer contains a group reactive with the isocyanate group.

The polymerization reaction may be, for example, a free radical polymerization carried out in solution using such solvents as toluene, xylene, ethyl acetate, acetone, methyl isobutyl ketone, methyl ethyl ketone, methyl propyl ketone, methyl amyl ketone, mineral spirits, ethylene or propylene glycol ether acetates, and other compatible solvents. Preferred solvents are ketones. Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cycohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene.

The free radical polymerization is usually carried out at temperatures from about 20° C. to about 200° C., preferably from 120° C. to 160° C. Generally, the amount of meta-isopropenyl-$\alpha,\alpha$-dimethylbenzyl isocyanate that may be incorporated into the addition polymer increases with increasing reaction temperature. The reaction may conveniently be done at the temperature at which the solvent or solvent mixture refluxes, although reflux is not necessary to the reaction. The initiator should be chosen to match the temperature at which the reaction is carried out, so that the half-life of the initiator at the reaction temperature should preferably be no more than thirty minutes.

The solvent or solvent mixture is generally heated to the reaction temperature and the monomers and initiator(s) are added at a controlled rate over a period of time, usually between 2 and 6 hours. A chain transfer agent or additional solvent may be added concurrently with the monomers and initiator(s). The mixture is usually held at the reaction temperature after the additions for a period of time to complete the reaction. Optionally, additional initiator may be added during the latter stages of the addition or after the addition is completed to ensure complete conversion. The acrylic copolymer preferably has a weight average molecular weight of at least 1000, and more preferably from 2000 to 50,000. The weight average molecular weight is determined by gel permeation chromatography using polystyrene standards.

The isocyanate-functional polymeric backbone is adducted with both the first substituent, attached via the linking group —C(=O)—NR$_2$—, and the second substituent, attached via the linking group —C(=O)—NH—. The number of first substituents attached via the linking group —C(=O)—NR$_2$— is represented in the formula hereinabove by j, where j is an integer from one to fifty. Preferably, j is from 1 to 20; more preferably, j is from 1 to 10. An amount of the first substituent is included sufficient to firmly anchor the polymer to the surface of the pigment. This amount is dependent on factors such as the size and nature of the metallic particle, and can readily be determined by one skilled in the art.

The number of second substituents attached via the linking group —C(=O)—NH— is represented in the formula hereinabove by k, where k is an integer from one to fifty. Preferably, k is from 1 to 20; more preferably, k is from 1 to 10. The amount of the second substituent present is chosen to optimize the dispersibility and gassing resistance of the treated flake.

The first substituent is a silane substituent when X is

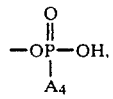

The three groups, $A_1$, $A_2$, and $A_3$, attached to the silicon atom may not all be alkyl.

Silane first substituents of the invention are formed by reacting silane-containing materials having isocyanate-reactive groups with isocyanate groups of the polymeric backbone. The isocyanate-reactive groups are selected from hydroxyl, amino, mercapto, or oxirane functional groups. Examples of such materials useful for forming the substituents compatible with the above-mentioned requirements are 3-aminopropyltrimethoxysilane, 3-aminopropyltriethoxysilane, 3-(N-methylamino) propyltrimethoxysilane 3-mercaptopropyltrimethoxysilane, and (3-glycidoxypropyl)methyldiethoxysilane and the like. Preferred are amino-functional silanes, especially 3-aminopropyltrimethoxysilane, 3-aminopropyltriethoxysilane, and 3-(N-methylamino) propyltrimethoxysilane. Silane-containing materials that may be utilized in making the compounds of the invention are commercially available from, for example, Hüls America, Inc.' Piscataway, N.J.; or from Dow Corning Corp., Midland, Mich.; or from Union Carbide Corp., Danbury, Conn.

When the isocyanate-reactive groups on the silane-containing material are reacted with the isocyanate or latent isocyanate groups on the polymer backbone, the isocyanate-reactive groups are converted by the reaction to the radical $D_1$ and the isocyanate or latent isocyanate groups are converted to the linking group $—C(=O)—NR_2—$. A hydroxyl isocyanate-reactive group forms $—O—$ as the radical $D_1$ and $—C(=O)—NH—$ as the linking group. An amino isocyanate-reactive group forms $—NA_5—$ as the radical $D_1$ and $—C(=O)—NH—$ as the linking group. A mercapto isocyanate-reactive group forms $—S—$ as the radical $D_1$ and $—C(=O)—NH—$ as the linking group. An oxirane isocyanate-reactive group forms

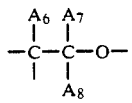

as the radical $D_1$ and

as the linking group, the two together forming the moiety

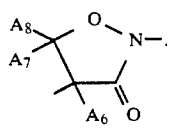

When the X of the first substituent is it is attached to the polymeric backbone by reaction with a material containing a hydroxyl group and at least one other group capable of reacting with isocyanate or latent isocyanate functionalities on the polymeric backbone. The material containing these groups is a straight or branched compound of one to twelve carbon atoms. The group capable of reacting with isocyanate or latent isocyanate functionalities may be hydroxyl, amino, or mercapto; said groups forming by reaction radicals $D_1$ of $—O—$, $—NA_5—$, and $—S—$, respectively. Representative examples of useful materials are diols, triols, and higher functionality polyols, such as ethylene glycol, propylene glycol, butylene glycol, neopentyl glycol, trimethylolethane, trimethylolpropane, 1,6-hexanediol, and pentaerythritol; mercaptoalcohols, such as mercaptoethanol, mercaptopropanol, mercaptobutanol, mercaptophenol, or 3-mercapto-1,2-propanediol; and aminoalcohols, such as diethanolamine, methylethanolamine, and 6-amino-1-hexanol. Preferably, an amino group or hydroxyl group is chosen to react with the isocyanate. Aminoalcohols are particularly useful.

The aminoalcohol is first reacted with the isocyanate functional groups on the polymeric backbone. The amino group is more reactive to isocyanate than the hydroxyl group. The difference in reactivity is exploited to minimize any crosslinking between polymeric backbones. The reaction between amino and isocyanate groups may be accomplished under mild conditions, such as by stirring the two together for five minutes at room temperature.

The remaining alcohol group may be converted to the desired phosphate through various reaction schemes, such as reaction with polyphosphoric acid, phosphoric acid, phosphorous acid, or phosphorous pentoxide, or analogs that have phosphorous atoms monosubstituted with an alkyl of one to ten carbon atoms, an alkoxy of one to ten carbon atoms, an alkoxyalkoxy of two to ten carbon atoms, an alkanoyloxy of two to ten carbon atoms, or a halogen. One preferred method is by addition of polyphosphoric acid at temperatures between about 25° C. and about 200° C. Other well-known methods, using materials such as phosphorus pentachloride or phosphorus oxychloride, are available.

The second substituent, represented in the formula hereinabove by $(D_2R_4C(=O)—)_mD_3(CH(R_5)CH_2O—)_nR_6$, is a structure having both a polyester or polyamide residue ($D_2$ being $—O—$ or $—NA_9—$, respectively) and an alkoxy poly(oxyalkylene) alcohol or alkoxy poly(oxyalkylene) amine residue ($D_3$ being $—O—$ or $—NA_9—$, respectively). The second substituent is linked to the polymeric backbone through the linking group $—C(=O)—NH—$. The linking group is formed by the reaction of an isocyanate group on the polymeric backbone with $D_2$.

The second substituent may be formed by the reaction of a lactone, lactam, amino acid, or hydroxy acid, or a polymer formed using any of these, with an alkoxy poly(oxyalkylene) alcohol or with an alkoxy poly(oxyalkylene) amine. The polyester or polyamide residue, represented by $(D_2R_4C(=O)—)$, has a degree of polymerization of m, m being an integer from one to one thousand. It is preferred that m be from 10 to 200. In a particularly preferred embodiment m is from 20 to 50. $R_4$ is a divalent radical selected from straight or branched alkylenes of three to thirty carbon atoms. Preferably, $R_4$ has three to twenty carbon atoms. In a more preferred embodiment $R_4$ is a straight chain alkylene of five carbon atoms.

The second substituent may be formed by polymerizing, for example, $\epsilon$-caprolactone onto an alkoxy poly(oxyalkylene) alcohol. In a particularly preferred embodiment, one equivalent of the alkoxy poly(oxyalkylene) alcohol is reacted with from 20 to 50 equivalents of $\epsilon$-caprolactone. The polymerization temperatures are typically between 100° C. and 150° C. Any of a number of catalysts known to be useful in esterification reactions may be utilized, such as tetrabutyl titanate or titanium diisopropoxide-bis(2,4-pentanedionate). For example, tetrabutyl titanate may be used advantageously at levels of from 0.05% to 0.5%, based on weight of reactants. The reaction may be done in the presence or absence of solvent. Substituents using lactams, such as caprolactam, hydroxy acids, such as 12-hydroxystearic acid, or amino acids, such as 12-aminododecanoic acid, may be prepared in a similar manner using methods well-known to the art.

The alkoxy poly(oxyalkylene) alcohol or alkoxy poly(oxyalkylene) amine employed can be formed by the alkoxy-initiated polymerization of ethylene oxide or mixtures of ethylene oxide with other epoxides of up to ten carbon atoms, such as propylene oxide or butylene oxide. $R_5$ is thus either hydrogen or a mixture of hydrogen and alkyls of one to eight carbon atoms. It is particularly advantageous for $R_5$ to be either hydrogen or a mixture of hydrogen and alkyls of one to three carbon atoms. The polymerization may be terminated by addition of an aziridine, such as propylene aziridine, to form the alkoxy poly(oxyalkylene) amine. The residue of the alkoxy poly(oxyalkylene) alcohol or amine contained in the compound, represented by $D_3(CH(R_5)CH_2O-)_nR_6$, is either alkoxy polyoxyethylene or an alkoxy polyoxyethylene/polyoxyalkylene copolymer, having a degree of polymerization of n, n being an integer from one to one thousand. Preferably, n is an integer from 20 to 200; more preferably, from 40 to 70. $R_6$ is an alkyl of one to thirty carbon atoms. $R_6$ is preferably an alkyl of one to ten carbon atoms. In a particularly preferred embodiment $R_5$ is hydrogen and $R_6$ is methyl.

The order in which the first and second substituents are reacted onto the polymeric backbone is not critical, and, in general, whether the two substituents are added simultaneously or sequentially will depend upon the particular functionalities chosen. In the case of latent isocyanate groups, such as blocked isocyanate groups, the conditions must allow the generation of the isocyanate functionality. The reactions of forming the first and second substituents and adducting them onto the polymeric backbone may be done neat or in solution. Addition of an inert solvent is preferred when the viscosity would otherwise be too high to achieve adequate mixing. Solvents containing hydroxyl groups and other active hydrogens are not preferred. Useful solvents include aromatic and aliphatic hydrocarbons, esters, ethers, and ketones. Such solvents as toluene, xylene, ethyl acetate, acetone, methyl isobutyl ketone, methyl ethyl ketone, methyl propyl ketone, methyl amyl ketone, mineral spirits, ethylene or propylene glycol ether acetates, and other compatible solvents may be useful.

In one preferred embodiment, the compound of the invention is used to modify the surface of metallic particles for use in aqueous coating compositions, particularly waterborne basecoat compositions. The metallic particles may be aluminum, gold bronze (copper-zinc alloys), copper, nickel, brass, magnesium, zinc, and alloys of these. Preferably, the metallic particles are aluminum, gold bronze, brass, and zinc. Aluminum is particularly preferred.

Aluminum particles as contemplated for use with the invention generally have a surface area that may range from about 0.05 to about 15 $m^2/g$ of aluminum. The aluminum particles that are specifically contemplated as preferred aspects of the invention are aluminum flakes, powders and granules. Aluminum flake pigments are particularly preferred in the waterborne basecoat compositions. In a preferred aspect, the surface area of the aluminum is from about 2 to about 14.5 $m^2/g$. The average particle size of the aluminum flake pigment is preferably from 1 to 70 microns, more preferably from 5 to 50 microns.

Metallic particles, such as aluminum flake pigment, used in the present invention may be prepared by grinding fine pieces or granules of metal by a mechanical means; for example, in a stamp mill, dry type ball mill, wet type ball mill attritor, or vibrating ball mill. Several percent of a grinding aid, or lubricant, may optionally be used. Useful grinding aids are known in the art, and include higher saturated or unsaturated acids, e.g., stearic acid, oleic acid, and higher aliphatic amines, such as stearylamine.

The metallic pigment may be ground in an organic solvent medium. Suitable organic solvents include aliphatic hydrocarbons like hexane, heptane, and mineral spirits; aromatic hydrocarbons like toluene, naphthas, and xylene; esters like ethyl acetate, butyl acetate, and glycol ether acetates such as propylene glycol methyl ether acetate; and ethers like tetrahydrofuran. After the grinding processing step, excess solvent may be removed by filtration to yield a paste preferably 30 to 80% by weight nonvolatiles. Further aspects of manufacture of the metallic pigment are contained in U.S. Pat. No. 4,565,716, issued Jan. 21, 1986 to Williams, Jr. et al., the entire contents of which are incorporated herein by reference.

Commercial aluminum flake pigment pastes are available from companies such as Silberline, Tamaqua, Pa.; Aluminum Company of America, Pittsburgh, Pa.; Obron Atlantic Corp., Painesville, Ohio; Reynolds Metals Company, Richmond, Va.; and Toyo Aluminum KK, Higashiku, Osaka, Japan in various grades, types and particle sizes. For certain waterborne paint applications, such as automotive basecoats, non-leafing aluminum flake pigments, such as Sparkle Silver ® 5245 AR aluminum paste from Silberline or 8160 AR aluminum paste from Obron, have been utilized.

The compounds of the invention may be either added during the grinding processing step or thereafter added to the metallic flake pigment paste formed by the grinding processing step. The compounds of the invention are effective for surface modification of the metallic flake pigment at levels of from 1% to 20%, preferably from 4% to 15%, and more preferably from 5% to 10%, based on the weight of the metallic flake pigment. It is particularly advantageous to use two embodiments of the invention in combination for treating the metallic flake pigment; one compound where X is

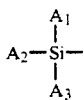

and one other compound where X is

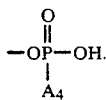

The effects of the two embodiments used together are thought to be beneficial because of different modes of interaction with metal surfaces. When the two embodiments described are used together, it is preferred to use approximately equal molar amounts of each. The silane-containing compound and the phosphate-containing compound may be used at levels from 0.5% to 10% each, based on the weight of the metallic flake pigment; but it has been found that from 2.5% to 5% each of the silane-containing compound and the phosphate-containing compound (based on the weight of the metallic flake pigment) is particularly useful for treating metallic flake pigment.

It is particularly useful in some cases to include tris (p-isocyanato-phenyl)-thiophosphate when treating the metallic flake pigment with the compounds of the invention. Tris (p-isocyanatophenyl)-thiophosphate is commercially available from Miles Corp., Pittsburgh, Pa. as an approximately 27% active solution in ethyl acetate under the tradename Desmodur ® RF-E. Desmodur ® RF-E is employed at levels of from trace amounts to 30%, based on the weight of the metallic flake pigment. Preferably, the amount of Desmodur ® RF-E used is from 0.25% to 5%, based on the weight of the metallic flake pigment.

The compounds of the invention and, optionally, the Desmodur ® RF-E, may be added during the grinding processing step of the metallic flake pigment. Other process condition and ingredients, including the grinding aid and solvent medium, are as previously described or known in the art. The compounds of the invention and, optionally, the Desmodur ® RF-E, may otherwise be added to the metallic flake pigment paste following the grinding processing step.

When the compounds of the invention and, optionally, the Desmodur ® RF-E, are added to the metallic flake pigment paste following the grinding processing step, a solvent is used for ease of processing. Preferably, the solvent is water compatible. The solvent may be, for example, a glycol ether, glycol ether acetate, ester or combination of these. It has been found to be particularly advantageous to employ a solvent that is less aggressive toward the metallic flake pigment. Glycol ethers or glycol ether acetates are preferred for this use, particularly propylene glycol methyl ether acetate. In some instances, it may be useful to add a minor amount of water to the solvent or solvent mixture. A general outline of the method of treatment is to dissolve the Desmodur ® RF-E in the cosolvent, which is preferably glycol ether acetate; slurry the solution with the metallic flake pigment for 5 to 90 minutes; dissolve the compound(s) of the invention in the cosolvent, which is preferably glycol ether acetate; add the solution of the compound(s) to the metallic pigment slurry, and continue mixing for 5 to 90 minutes. The solutions may be made at temperatures preferably between 20° C. and 100° C. Generally, temperatures below 50° C. are used.

The surface-modified metallic flake pigment is useful in aqueous compositions. The surface-modified metallic flake pigment may be combined with a film-forming resin and water to form a waterborne paint composition. Other ingredients well-known in the art to be useful in such compositions may be included, such as crosslinkers and other resins; plasticizers; additional cosolvents to aid in stabilization or application of the composition; rheology control agents; other pigments; UV light stabilizers and antioxidants; catalysts; fungicides; and so on.

Suitable film-forming resins are water-dispersible or water-soluble ionic or nonionic resins. Anionic or nonionic resins are preferred for use in topcoat applications. The resins may be acrylic, vinyl, polyurethane, polyester, alkyd, epoxy, or other polymers known to be useful in films. Examples of water-dispersible polymers used for topcoats are contained in U.S. Pat. Nos. 4,794,147; 4,791,168; and 4,518,724, all of which are incorporated herein by reference. Such systems typically also include a crosslinker, such as aminoplast resins, polyamines, blocked polyisocyanates, and so on, depending on the functionality available for crosslinking on the film forming resin. For example, hydroxyl-functional acrylic or polyurethane resins can be cured using aminoplast resins. For this purpose, melamine-formaldehyde resins are particularly preferred. Melamine-formaldehyde resins of the kind contemplated are commercially available from, for example, Monsanto Co., St. Louis, Mo.; and American Cyanamid, Wayne, N.J. A polymeric-type melamine may be used, particularly when the film forming resin is anionically stabilized. Such polymeric-type melamines do not require strong acid catalysis. When the film-forming resin is nonionically stabilized, a polymeric melamine may be used or a monomeric melamine may be used in conjunction with a strong acid catalyst like a sulfonic acid or blocked sulfonic acid.

The film-forming resin or the crosslinker may comprise functionality that can react with a reactive group on the compound of the invention during the curing step. The polymeric network formed during cure would then include a residue of the compound, covalently bonded to the polymeric network. The ability of the compound to react during the curing step is independent of its function in surface modifying the metallic flake pigment.

Additional cosolvents may be added to aid in stabilization or application of the composition. The more preferred solvents are acetates such as butyl acetate, hexyl acetate, and octyl acetate; glycol ethers and glycol ether acetates, such as propylene glycol ether and propylene glycol monomethyl ether acetate; and ketones, such as methyl propyl ketone, methyl isobutyl ketone, and methyl hexyl ketone. Glycol ethers and glycol ether acetates are especially preferred.

Other pigments, if used, are preferably incorporated as pastes or dispersions prepared by using grinding resins or pigment dispersants according to methods well known in the art. The term "pigments" is meant to encompass organic and inorganic compounds that are colored materials, fillers, flake materials, and other materials of kind that the art normally names as pigments. If pigments other than the surface modified metallic flake pigment are included, they are usually used in an amount of 1% to 200%, based on the total solid weight of the reactants. The surface-modified metallic flake pigments used according to the invention are typically used at amounts of 1% to 30%, based on the total solid weight of the reactants.

It may be desirable to include small amount of rheology control agents, for example fumed silicas, hectorite clays, bentonite clays, or cellulosics like cellulose acetate butyrate. Such materials are usually used at levels of less than 10% based on the total solid weight of reactants. Rheology control agents are used to control the flow and levelling of the composition during application and curing steps. The rheology control agent is also useful for controlling the metallic appearance of the coating. Such materials may help "fix" the pigment flake surface in an alignment parallel to the surface of the coating to maximize the brightness when viewed head-on and to maximize the darkness when viewed obliquely.

The prepared coating composition is applied to a substrate by any of a number of conventional means, for example by spraying, brushing, dipping or flowing. The preferred methods of application are by spraying or electrostatic spraying. These methods are widely used, especially in the application of automotive coatings. For example, the coating may be applied using a Model 62 syphon spray gun (available from Binks Manufacturing Corp., Franklin Park, Ill.) with 50-80 psi atomizing air pressure.

The substrate to which the coating composition of this invention is to be applied may be, for example, metal, ceramic, plastic, glass, paper, or wood. The substrate may also be any of the aforementioned materials precoated with this or another coating composition. The coating compositions of this invention have been found to be particularly useful over precoated steel or plastic substrates in automotive applications. They are particularly suited to use over primed automotive substrates as topcoat formulations or basecoat formulations that are overcoated with clearcoat formulations.

After application of the coating composition to the substrate, the coating is cured, preferably by heating at a temperature and for a length of time sufficient to cause the conversion of all or nearly all of the reactive groups. The cure temperature is usually from 115° C. to 180° C., and the length of cure is usually 15 minutes to 60 minutes. Preferably, the coating is cured at 120°-150° C. for 20 to 30 minutes. The thickness of the cured coating can be from 1 to 150 microns, but when used as an automotive topcoat or basecoat the coating thickness is generally from 10 to 70 microns.

In a preferred embodiment of the invention, the coating composition of the present invention is used as a basecoat and is overcoated with a transparent topcoat layer, known commonly in the art as a clearcoat. The basecoat may be cured before the clearcoat is applied or the basecoat may be given a wet-on-wet application of a clearcoat. By the term "wet-on-wet" it is meant that after application the basecoat is allowed to flash, or dry, to remove most of the water and other solvent that it contained, but it is not cured before the clearcoat composition is applied. After the clearcoat composition is applied, it is allowed to flash or dry for a period of time, then the basecoat and the clearcoat are cured together.

The clearcoat may be a coating composition according to this invention or another composition known to the art to have utility as a clearcoat. The clearcoat does not necessarily need to use the cure mechanism used by the basecoat, although the cure mechanisms used must not interfere with one another.

The basecoat may be applied in one or two layers, with a short period between application of layers to allow solvent and water to evaporate (termed a "flash" period). After application, the basecoat may be further dried, preferably at a slightly elevated temperature, as in a 120° F. oven, for a period of 5 to 20 minutes before the clear coat composition is applied. The clearcoat composition is preferably applied by spraying, in one layer, or preferably two layers with a short flash between layers. The clearcoat composition is allowed to flash under ambient or heated conditions for 1-20 minutes. The uncured coatings are then cured, usually by thermoset methods as described hereinabove. The resulting appearance and physical properties are excellent.

The following examples are provided to further illustrate the invention.

EXAMPLES 1-4. Preparation of Silane- and Phosphate-Functional Compounds

Example 1. Preparation of Silane-Functional Compound

Part A. Synthesis of Polymeric Backbone

A reactor, equipped with a thermocouple, an add funnel, and a Friedrichs condenser with a drying tube, was charged with 283.3 grams of methyl propyl ketone and heated with stirring to reflux (102° C.). A mixture of 241.5 grams of TMI ® (American Cyanamid Company, Wayne, N.J.), 312.5 grams styrene, 256.0 grams butyl methacrylate, and 40.5 grams Lupersol ® 575-M75 (Elf Atochem North America, Inc., Philadelphia, Pa.) was then added over a period of about 3 hours, all the while maintaining the reactor contents at reflux. The reflux temperature at the end of the add was 106° C., and the reflux was held for another 30 minutes. A mixture of 90.0 grams of methyl propyl ketone and 20.2 grams of Lupersol ® 575-M75 was added over a period of twenty minutes. The reaction was held at reflux for an hour following the final add. The product had a theoretical solids content of 68.8% and a measured isocyanate content of 0.93 milliequivalents per gram (meq/g).

Part B. Synthesis of the Polyester/Polyether Substituent

A reactor was charged with 249.6 grams of MPEG 1350 (molecular weight 1367, obtained from BASF Corp., Wyandotte, Mich.), 302.1 grams ε-caprolactone, and 0.2 grams phosphoric acid. The mixture was held at 136°-150° C. for about 15 hours. At the end of the hold, the measured nonvolatiles were 99.7%. The theoretical molecular weight was 3021 Daltons.

Part C. Synthesis of Silane-Functional Compound

A reactor was charged with 106.6 grams of the polymeric backbone from Part A, 133.6 grams of the polyester/polyether substituent from Part B, and 0.01 gram dibutyl tin dilaurate. The theoretical starting isocyanate content was 0.36 meq/g. The contents of the flask were held at about 95° C. until the isocyanate content measured 0.18 meq/g. The reaction mixture was then cooled to 45° C., and 1.0 gram of 3-aminopropyltrimethoxysilane was added. After five minutes of stirring, 2.4 grams of ethanolamine was added. The measured isocyanate content was then 0.00 meq/g. The nonvolatiles were measured at 84.7%.

EXAMPLE 2

Preparation of Phosphate-Functional Compound

Part A. Synthesis of Polymeric Backbone

A reactor, equipped with a thermocouple, an add funnel, and a Friedrichs condenser with a drying tube, was charged with 299.5 grams of methyl propyl ketone and heated with stirring to reflux (102° C.). A mixture of 241.5 grams of TMI ® (American Cyanamid Company, Wayne, N.J.), 187.5 grams styrene, 426.6 grams butyl methacrylate, and 42.8 grams Lupersol ® 575-M75 (Elf Atochem North America, Inc., Philadelphia, Pa.) was then added over a period of about 3.5 hours, all the while maintaining the reactor contents at reflux. The reflux temperature at the end of the add was 105° C., and the reflux was held for another 30 minutes. A mixture of 94.7 grams of methyl propyl ketone and 21.4 grams of Lupersol ® 575-M75 was added over a period of twenty minutes. The reaction was held at reflux an hour following the final add. The product had a theoretical solids content of 68.8% and a measured isocyanate content of 0.83 milliequivalents per gram (meq/g).

Part B. Synthesis of Phosphate-Functional Compound

A reactor was charged with 89.8 grams of the polymeric backbone from Part A and 117.2 grams of the polyester/polyether substituent from Example 1-Part B. The theoretical starting isocyanate content was 0.38 meq/g. The contents of the flask were held at about 95° C. until the isocyanate content measured 0.18 meq/g. The reaction mixture was then cooled to 39° C., and 2.3 gram of ethanolamine was added and stirred for 30 minutes. The reactor was equipped with a Barrett-type receiver, and 3.2 grams of polyphosphoric acid and 102.6 grams of toluene were added. The contents of the reactor were held under reflux for an hour. About 0.2 ml of water and 25.7 grams of solvent were removed. The nonvolatiles were measured at 62.2%.

EXAMPLE 3

Preparation of Silane-Functional Compound

Part A. Synthesis of Polymeric Backbone

A reactor was charged with 216.0 grams of methyl amyl ketone and heated with stirring to reflux (152° C.). A mixture of 302.1 grams of TMI ® (American Cyanamid Company, Wayne, N.J.), 52.1 grams styrene, 193.1 grams of butyl acrylate, 213.6 grams butyl methacrylate, and 76.0 grams of a 50% solution of t-butyl peroxy acetate in aromatic solvent (b.p. 162° C.) was then added over a period of about 3 hours, all the while maintaining the reactor contents at reflux. The reflux temperature at the end of the add was 153° C., and the reflux was held for another 30 minutes. A mixture of 57.9 grams of methyl amyl ketone and 38.4 grams of the 50% solution of t-butyl peroxy acetate in aromatic solvent was added over a period of 30 minutes. The reaction was held at reflux for an hour and a half following the final add. The product had a measured solids content of 69.3% and a measured isocyanate content of 1.21 milliequivalents per gram (meq/g).

Part B. Synthesis of the Polyester/Polyether Substituent

A reactor was charged with 325.0 grams of MPEG 2000 (molecular weight 2000, obtained from BASF Corp., Wyandotte, Mich.), 649.9 grams $\epsilon$-caprolactone, and 2.0 mls phosphoric acid. The mixture heated to 140° C. and was held at that temperature for about 8 hours. At the end of the hold, the measured nonvolatiles were 99.6%. The theoretical molecular weight was 6000 Daltons.

Part C. Synthesis of Silane-Functional Compound

A reactor was charged with 972.8 grams of the polymeric backbone from Part A and 674.0 grams of the polyester/polyether substituent from Part B. The contents of the reactor were heated to 117° C. and 6.7 grams of a 1% solution of dibutyl tin dilaurate in methyl propyl ketone was added. The contents of the flask were further heated to 150° C. and held for 10 minutes, then cooled to room temperature. The isocyanate content was measured as 0.547 meq/g.

605.0 grams of this product was charged to a clean, dry reactor, and 7.3 grams of 3-aminopropyltriethoxysilane were added. After eight minutes of stirring, 18.2 grams of ethanolamine were added. The mixture was stirred for another 20 minutes, followed by addition of 224.7 grams of toluene. The nonvolatiles were measured at 60.5%.

EXAMPLE 4

Preparation of Phosphate-Functional Compound

Part A. Synthesis of Polymeric Backbone

A reactor was charged with 215.2 grams of methyl amyl ketone and heated with stirring to reflux (151° C.). A mixture of 303.1 grams of TMI ® (American Cyanamid Company, Wayne, N.J.), 52.8 grams styrene, 192.4 grams of butyl acrylate, 213.3 grams butyl methacrylate, and 76.0 grams of a 50% solution of t-butyl peroxy acetate in aromatic solvent (b.p. 162° C.) was then added over a period of 3 hours, all the while maintaining the reactor contents at reflux. The reflux temperature at the end of the add was 154° C., and the reflux was held for another 30 minutes. A mixture of 57.6 grams of methyl amyl ketone and 38.4 grams of of the 50% solution of t-butyl peroxy acetate in aromatic solvent was added over a period of twenty-five minutes. The reaction was held at reflux an hour and a half following the final add. The product had a measured solids content of 69.9% and a measured isocyanate content of 1.23 milliequivalents per gram (meq/g).

Part B. Synthesis of the Polyester/Polyether Substituent

A reactor was charged with 260.8 grams of MPEG 2000 (molecular weight 2000, obtained from BASF Corp., Wyandotte, Mich.), 521.6 grams $\epsilon$-caprolactone, and 1.7 mls phosphoric acid. The mixture heated to 200° C. The mixture was cooled to 140° C. and held at that temperature for 2 hours. At the end of the hold, the measured nonvolatiles were 99.7%. The theoretical molecular weight was 6000 Daltons.

Part C. Synthesis of Phosphate-Functional Compound

A reactor was charged with 618.0 grams of the polymeric backbone from Part A, 432.0 grams of the polyester/polyether substituent from Part B, and 4.3 grams of a 1% solution of dibutyl tin dilaurate in methyl propyl ketone. The contents of the flask were heated to reflux and held for 20 minutes (final temperature 175° C.), then cooled to 101° C. and 35.9 grams of ethanolamine were added and stirred for two hours. When the temperature had reached 40° C., 37.9 grams of polyphosphoric acid and 372.4 grams of toluene were added. The contents of the reactor were heated to reflux(125° C.) and held under reflux for 40 minutes. The nonvolatiles were measured at 62.5%.

EXAMPLES 5-8

Preparation of Surface Modified Aluminum Flake Pigments

Example 5 Preparation of Aluminum Pigment Slurry 160.0 grams of propylene glycol methyl ether acetate were heated to 40° C., after which 5.9 grams of the silane-functional compound prepared according to Example 1 and 8.0 grams of the phosphate-functional compound prepared according to Example 2 were added and mixed until dissolved. 153.8 grams of aluminum flake pigment paste (Stapa Metallux R-8754, 65% nonvolatile paste available from Obron Atlantic Corp., Plainesville, Ohio) was then slurried with the solution of the silane- and phosphate-functional compounds for 15 minutes.

EXAMPLE 6

Preparation of Aluminum Pigment Slurry Using Desmodur ® RF-E 120.0 grams of propylene glycol methyl ether acetate, 5.0 grams of Desmodur ® RF-E, and 90.1 grams of aluminum flake pigment paste (Stapa Metallux R-8754, 65% nonvolatile paste available from Obron Atlantic Corp., Plainesville, Ohio) were slurried together for 15 minutes. In a separate container, 40.0 grams of propylene glycol methyl ether acetate were heated to 40° C., after which 5.9 grams of the silane-functional compound prepared according to Example 1 and 8.0 grams of the phosphate-functional compound prepared according to Example 2 were added and mixed until dissolved. The solution of the silane- and phosphate-functional compounds was then mixed into the aluminum slurry and agitated for 15 minutes.

EXAMPLE 7

Preparation of Aluminum Pigment Slurry 150.0 grams of propylene glycol methyl ether acetate and 10.0 grams of deionized water were heated to 40° C., after which 4.1 grams of the silane-functional compound prepared according to Example 3 and 4.0 grams of the phosphate-functional compound prepared according to Example 4 were added and mixed until dissolved. 153.8 grams of aluminum flake pigment paste (Stapa Metallux R-8754, 65% nonvolatile paste available from Obron Atlantic Corp., Plainesville, Ohio) was then slurried with the solution of the silane- and phosphate-functional compounds for 15 minutes.

EXAMPLE 8

Preparation of Aluminum Pigment Slurry 150.0 grams of propylene glycol methyl ether acetate and 10.0 grams of deionized water were heated to 40° C., after which 5.9 grams of the silane-functional compound prepared according to Example 1 and 8.0 grams of the phosphate-functional compound prepared according to Example 2 were added and mixed until dissolved. 153.8 grams of aluminum flake pigment paste (Stapa Metallux R-8754, 65% nonvolatile paste available from Obron Atlantic Corp., Plainesville, Ohio) was then slurried with the solution of the silane- and phosphate-functional compounds for 15 minutes.

EXAMPLES 9-12

Preparation of Waterborne Basecoat Compositions Containing Surface Modified Aluminum Flake Pigments The materials listed in the table were used to prepare paint compositions according to the following methods.

METHOD OF PREPARATION OF EXAMPLES 9-11 AND COMPARATIVE EXAMPLE A

The Cymel ® 327 (available from American Cyanamid, Wayne, N.J.) and the ethylene glycol monobutyl ether were premixed and added to the thickner (an aqueous solution of hectorite clay (2.5%) and Pluracol 1010 (0.5%, obtained from BASF Corp., Wyandotte, Mich.)) under agitation. The anionic polyurethane dispersion was a 26% aqueous anionic dispersion of a polyurethane synthesized according to the methods described in U.S. Pat. No. 4,791,168. The viscosity of the dispersion is approximately 10,000 centipoise. The anionic polyurethane dispersion and the Tinuvin ® 1130 (available from Ciba Geigy Corp., Hawthorne, N.Y.) were then added to this mixture under agitation. The aluminum slurry was mixed with a branched polyester and the aqueous dimethylethanolamine. The branched polyester was prepared according to the methods described in U.S. Pat. No. 4,791,168. The branched polyester was 70% nonvolatiles in a mixture of butanol and ethylene glycol monobutyl ether. (For the Comparative Example A, the aluminum slurry was prepared by slurrying the VP 46432/G aluminum pigment paste, available from Obron Atlantic Corp., Plainesville, Ohio, in the 10.7 grams of ethylene glycol monobutyl ether.) The aluminum slurry mixture was then added to the polyurethane mixture under agitation. The pH was adjusted to 7.7 with dimethylethanolamine. The deionized water was added to adjust the final viscosity.

METHOD OF PREPARATION OF EXAMPLE 12

The Resimene ® 747 (available from Monsanto Co., St. Louis, Miss.) and the ethylene glycol monobutyl ether were premixed and added to the thickener under agitation. The 126.6 grams of nonionic polyurethane dispersion were then added to this mixture under agitation. The nonionic polyurethane dispersion was synthesized according to the methods described in U.S. Pat. No. 4,794,147. The nonvolatiles were 38% and the viscosity of the dispersion was approximately 3,000 centipoise. The aluminum slurry was mixed with the 50.6 grams of nonionic polyurethane dispersion. The aluminum slurry mixture was then added to the polyurethane mixture under agitation. The Tinuvin ® 1130 and Nacure ® 2500 (available from King Industries, Norwalk, Conn.) were added. The deionized water was added to adjust the final viscosity.

| Ingredient | Example 9 | Example 10 | Example 11 | Example 12 | Example A |
|---|---|---|---|---|---|
| Thickener | 160.0 | 160.0 | 160.0 | 40.0 | 160.0 |
| Cymel 327 | 22.2 | 22.2 | 22.2 | | 22.2 |
| Resimene 747 | | | | 30.0 | |
| Ethylene glycol monobutyl | 5.6 | 5.6 | 5.6 | 7.6 | 5.6 |

-continued

| Ingredient | Example 9 | Example 10 | Example 11 | Example 12 | Example A |
|---|---|---|---|---|---|
| ether | | | | | |
| Tinuvin 1130 | 1.5 | 1.5 | 1.5 | 1.5 | 1.5 |
| Anionic Polyurethane Dispersion | 230.8 | 230.8 | 230.8 | | 230.8 |
| Nonionic Polyurethane Dispersion | | | | 126.6 | |
| Example 5 Aluminum Slurry | 49.2 | | | | |
| Example 6 Aluminum Slurry | | 49.2 | | | |
| Example 7 Aluminum Slurry | | | 48.4 | | |
| Example 8 Aluminum Slurry | | | | 49.2 | |
| VP 46432/G | | | | | 23.1 |
| Ethylene glycol monobutyl ether | | | | | 10.7 |
| Branched Polyester | 27.4 | 27.4 | 27.4 | | 27.4 |
| Nonionic Polyurethane Dispersion | | | | 50.6 | |
| 20% aqueous dimethyl-ethanolamine | 2.95 | 2.95 | 2.95 | | 2.95 |
| Nacure 2500 | | | | 5.3 | |
| Deionized water | 103.2 | 113.0 | 72.0 | 49.0 | 47.3 |

250 grams of each of basecoat compositions was tested for a period of 30 days at 40° C. to determine the amount of hydrogen gas evolved. (Hydrogen gas is a by-product of the oxidation of the aluminum metal by water). Evolution of no more than 23 milliliters of hydrogen in a 30-day period is considered to be acceptable. (A composition containing an untreated aluminum will typically generate 23 milliliters of hydrogen within 1 day.) The results are summarized here:

| Basecoat Composition | ml hydrogen after 30 days at 40° C. |
|---|---|
| Example 9 | 18 |
| Example 10 | 4 |
| Example 11 | 0 |
| Example 12 | 0 |
| Comparative Example A | 4 |

Appearance panels were hand-sprayed using a Model 62 syphon spray gun (available from Binks Manufacturing Corp., Franklin Park, Ill.) with 65 psi atomizing air pressure. To prepare the appearance panels, the basecoat compositions were applied over primed steel panels and overcoated with a conventional solvent-based clearcoat, then the uncured coatings were cured for about 30 minutes at about 250° F., all in the manner previously detailed hereinabove. Examples 9-11, when constrasted with Comparative Example A, exhibited improved appearance. This improvement was characterized by brighter face appearance and less graininess.

The invention has been described in detail, with reference to specific embodiments thereof. It is to be understood that modifications and variations may be made within the spirit and scope of the invention.

We claim:

1. A composition, comprising a metal surface modified with at least one compound; wherein the compound is of the formula:

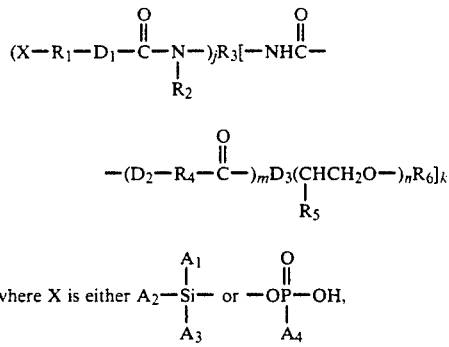

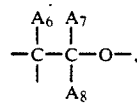

wherein
$A_1$, $A_2$, $A_3$, and $A_4$ are each independently hydroxy, alkyl of one to ten carbon atoms, alkoxy of one to ten carbon atoms, alkoxyalkoxy of two to ten carbon atoms, alkanoyloxy of two to ten carbon atoms, or halogen, with the proviso that $A_1$, $A_2$, and $A_3$ may not all be alkyl;

$R_1$ is a divalent radical selected from straight or branched alkylenes of one to twelve carbon atoms;

$D_1$ is either a divalent radical selected from the group consisting of —O—, —$NA_5$—, and —S—, or a trivalent radical of the formula $$-\underset{\underset{A_8}{|}}{\overset{\overset{A_6}{|}}{C}}-\underset{|}{\overset{\overset{A_7}{|}}{C}}-O-$$

wherein $A_5$, $A_6$, $A_7$ and $A_8$ are each independently hydrogen or alkyl of one to twelve carbon atoms;

$R_2$ is hydrogen or a covalent bond with $D_1$, with the proviso that $R_2$ is only a covalent bond with $D_1$ when $D_1$ is a trivalent radical;

$R_3$ is a polymeric backbone;

$D_2$ and $D_3$ are divalent radicals, each independently —O— or —$NA_9$—, wherein $A_9$ is hydrogen or alkyl of one to twelve carbon atoms;

$R_4$ is a divalent radical selected from straight or branched alkylenes of three to thirty carbon atoms;

$R_5$ is hydrogen or a mixture of hydrogen and alkyl of one to eight carbon atoms;

$R_6$ is an alkyl of one to thirty carbon atoms;

m and n are integers, each independently being one to one thousand, and j and k are integers, each independently being one to fifty.

2. A composition according to claim 1, wherein the metal is a metallic flake pigment.

3. A composition according to claim 2, further comprising an organic solvent.

4. A composition according to claim 2, further comprising water.

5. A composition according to claim 2, wherein the metallic flake pigment is an aluminum flake pigment.

6. A composition according to claim 5, wherein the aluminum flake pigment is surface modified with at least one compound wherein X is

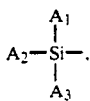

and at least one other compound wherein X is

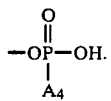

7. A composition according to claim 5, wherein the $D_1$ is either —O— or —NH—, and wherein the $D_2$ and $D_3$ are each —O—.

8. A composition according to claim 5, wherein the $R_3$ is an acrylic polymeric backbone.

9. A composition according to claim 8, wherein the molecular weight of the acrylic polymeric backbone is from 2000 to 50,000.

10. A composition according to claim 5, wherein the m is from 20 to 50 and the n is from 40 to 70.

11. A composition according to claim 5, wherein the $R_5$ is hydrogen and the $R_6$ is methyl.

12. A composition according to claim 5, wherein the j and k are each independently from 1 to 10.

13. A composition according to claim 5, wherein $R_4$ is

14. A composition, comprising a polymeric network; wherein the polymeric network comprises a residue of a compound according to claim 1 and the metal surface modified with the compound.

15. A composition according to claim 14, wherein the metal is a metallic flake pigment.

16. A coated article, comprising a substrate with a coating thereon; wherein said coating comprises a composition according to any of claims 2, 5, 6, or 15.

17. A method for producing a metallic flake pigment surface modified with at least one compound as described in claim 1, comprising mixing the metallic flake pigment with the compound.

18. A method according to claim 17, wherein the metallic flake pigment is an aluminum flake pigment.

19. A method according to claim 17, wherein the compound is first dissolved in an organic solvent before mixing with the metallic flake pigment.

20. A method according to claim 19, wherein the organic solvent is a glycol ether or a glycol ether acetate.

21. A method as recited in claim 19, wherein the metallic flake pigment is also mixed with tris (p-isocyanato-phenyl)thiophosphate.

22. A method as put forth in claim 21 wherein the metallic flake pigment is an aluminum flake pigment.

23. A method of making an aqueous composition, comprising the steps of:
A. Producing a metallic flake pigment surface modified with at least one compound as described in claim 1, by mixing the metallic flake pigment with the compound;
B. Combining the surface-modified metallic flake pigment, water, and at least one water-compatible polymer.

24. A method for producing a metallic flake pigment, comprising forming the metallic flake pigment in the presence of a compound as described in claim 1.

25. A method according to claim 24, wherein the metallic flake pigment is an aluminum flake pigment.

* * * * *